United States Patent [19]
Curtis

[11] Patent Number: 5,969,643
[45] Date of Patent: Oct. 19, 1999

[54] METHOD AND APPARATUS FOR DETERMINING RELATIVE LOCOMOTIVE POSITION IN A TRAIN CONSIST

[75] Inventor: Dwight D. Curtis, Cedar Rapids, Iowa

[73] Assignee: Westinghouse Air Brake Company, Germantown, Md.

[21] Appl. No.: 09/028,595

[22] Filed: Feb. 23, 1998

[51] Int. Cl.$^6$ .................................................. G08G 1/123
[52] U.S. Cl. ...................... 340/988; 340/933; 340/989; 342/457
[58] Field of Search ..................................... 340/988, 989, 340/990, 991, 992, 993, 933; 342/450, 454, 455, 457; 701/19, 28, 70

[56] References Cited

U.S. PATENT DOCUMENTS

| | | | |
|---|---|---|---|
| 3,740,549 | 6/1973 | Thorne-Booth | 246/122 R |
| 4,042,810 | 8/1977 | Mosher | 235/150.2 |
| 5,129,605 | 7/1992 | Burns et al. | 246/5 |
| 5,450,329 | 9/1995 | Tanner | 340/973 |
| 5,574,469 | 11/1996 | Hsu | 342/455 |
| 5,621,417 | 4/1997 | Hassan et al. | 342/457 |
| 5,757,291 | 5/1998 | Kull | 340/988 |

*Primary Examiner*—Jeffery A. Hofsass
*Assistant Examiner*—Van T. Trieu
*Attorney, Agent, or Firm*—Whitham, Curtis & Whitham

[57] ABSTRACT

A method and apparatus for determining the position of one or more locomotives in a train consist is disclosed. A receiver is mounted to each locomotive in a train consist. The receiver receives a signal such as a reference signal from a global positioning system determines a coordinate position for that locomotive. A processor determines a relative position for the locomotive in the train consist based on its determined coordinate position. This process is periodically repeated for each locomotive in the train consist so that the configuration of locomotives in the train consist may be tracked or verified as cars are added or removed from the train.

18 Claims, 5 Drawing Sheets

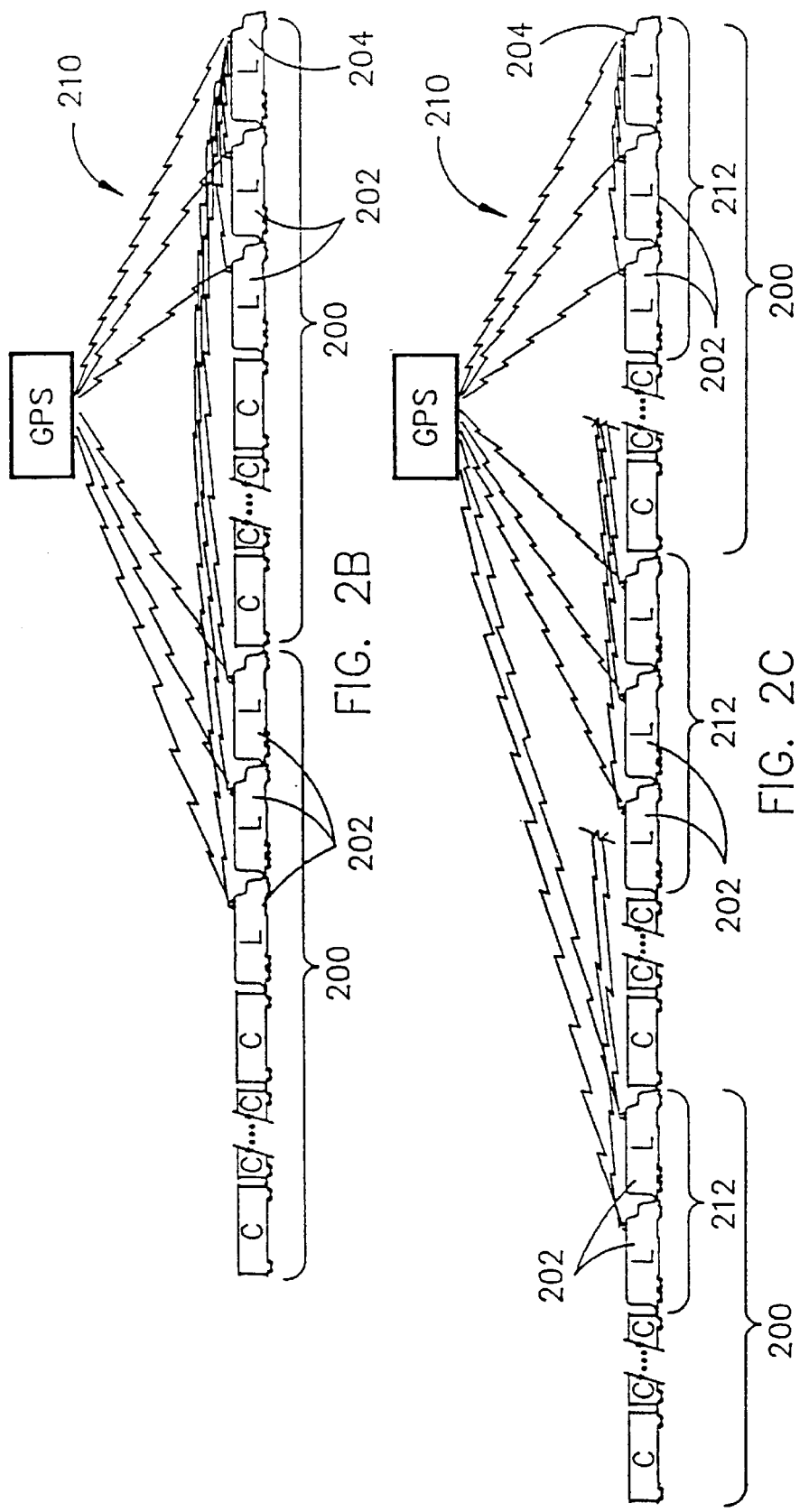

METHOD AND APPARATUS FOR DETERMINING RELATIVE LOCOMOTIVE POSITION IN A TRAIN CONSIST

BACKGROUND OF THE INVENTION

The present invention generally relates to train monitoring and control systems, and more particularly to a methods and apparatus for determining relative locomotive position in a train consist.

Distributed power systems allow locomotives to be distributed throughout a train by utilizing radio communication to remotely control the operation each locomotive from a lead locomotive. Typically, distributed power systems allow the crew of a train riding in the lead locomotive to monitor and control tractive effort and braking power of multiple train consists comprising one or more locomotives and an associated group of cars. Preferably, each locomotive of the train may be operated in either a lead or a remote role thereby allowing train consists to be joined together along high traffic corridors and separated for intermodal or general freight service. In this manner, distributed power systems allow safer, more efficient hauling of all types of freight over all types of terrain.

Knowledge of the order and position of locomotives in each train consist is required to ensure safe operation and handling of the train. However, the order and position of locomotives and cars may periodically change as train consists are joined and separated or cars are added to or removed from a particular consist. Presently, the position of locomotives in the train consists is tracked via a manually created consist list entered into the distributed power system's computer. This list is revised periodically as train consists are joined together or as cars and locomotives are added to or removed from a consist. However, this method of creating a consist list is subject to human error and may prove to be impossible to manage for long trains.

It is therefore desirable to improve the safety and efficiency of railroad operations by utilizing a global positioning system to determine relative locomotive position in a train consist wherein the locomotive position information may be utilized to track and verify the configuration of the consist.

SUMMARY OF THE INVENTION

Therefore, a principle object of the present invention is to provide a method and apparatus for determining the relative position of one or more locomotives in a train consist utilizing a received signal such as a reference signal from a global positioning system or the like.

Another object of the present invention is to provide a method and apparatus for utilizing a global positioning system to track or verify the configuration of a train consist.

Accordingly, the present invention provides a novel method and apparatus for tracking or verifying the position of one or more locomotives in a train consist utilizing received signal such as a reference signal from a global positioning system or the like. A receiver is mounted to each of the locomotives of a train consist. The receiver receives a signal such as a reference signal from a global positioning system and determines a coordinate position for the respective locomotive. A processor, operatively coupled to the receiver, determines a relative position for the locomotive in the train consist based on its coordinate position. This process is periodically repeated for each locomotive in the train so that the configuration of the train consist may be tracked or verified as cars and locomotives are added to or removed from the train.

It is to be understood that both the foregoing general description and the following detailed description are exemplary and explanatory only and are not restrictive of the invention claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 2B is a diagrammatic view illustrating a train having two train consists; and FIG. 2C is a diagrammatic view illustrating a train having multiple train consists;

DESCRIPTION OF THE PREFERRED EMBODIMENT

Reference will now be made in detail to the presently preferred embodiment of the invention, an example of which is illustrated in the accompanying drawings.

Figure 1:
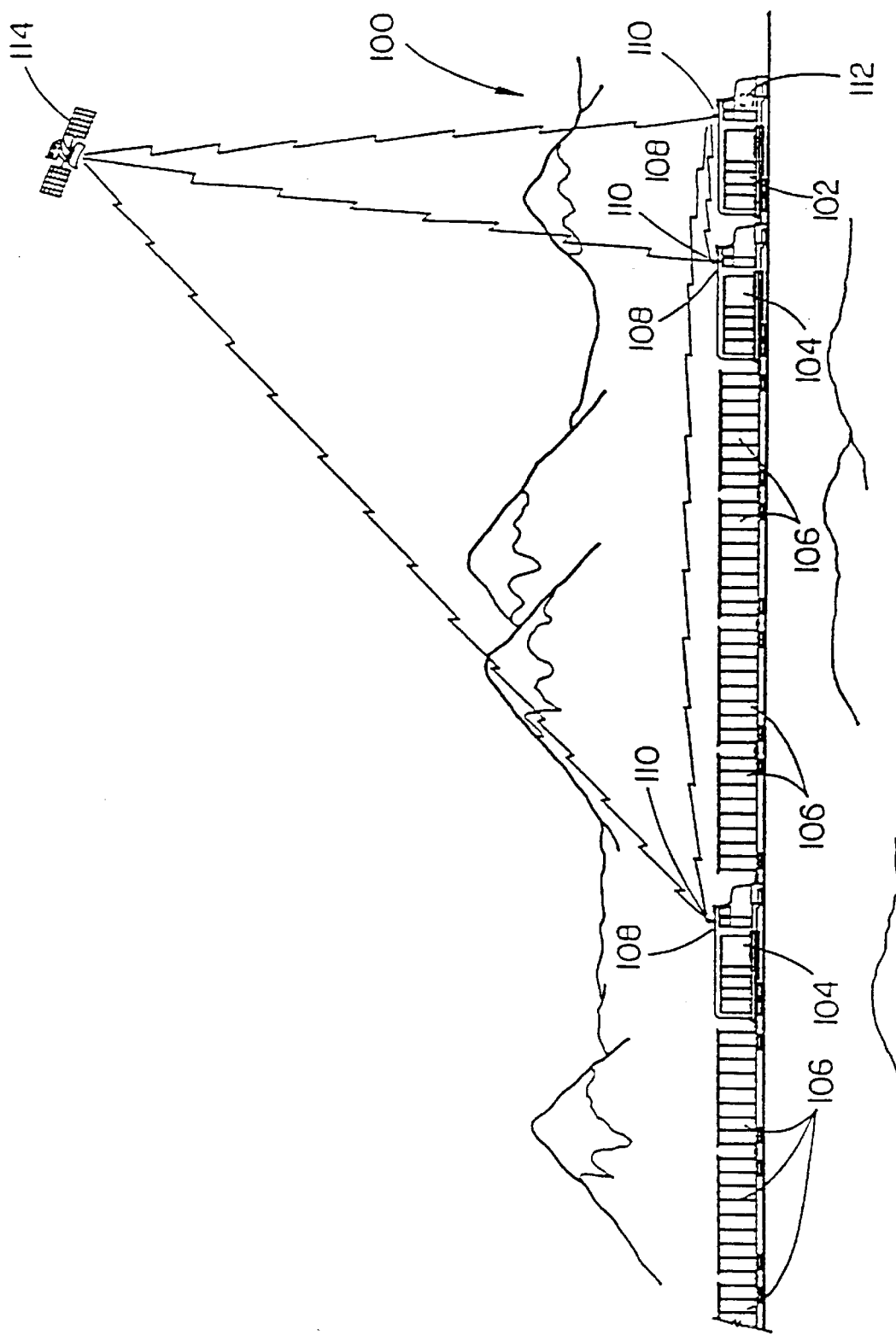
FIG. 1 depicts a train having apparatus for determining the position of one or more locomotives in a train consist utilizing a global positioning system.

Referring now to FIG. 1, a train having a system for tracking or verifying the position of one or more locomotives in a train consist is shown. The train consist 100 preferably comprises one or more locomotives 102 & 104 coupled to a plurality of cars 106 which may be configured for transporting bulk raw materials, freight, or passengers. The cars 106 within the train consist 100 may further be grouped together in blocks, or units of cars which are moving toward a common destination. A receiver 108 may be mounted to each locomotive 102 & 104 of the train consist 100. Preferably, the receiver 108 receives a signal, such as a reference signal from a global positioning system or the like and determines a position for the respective locomotive. A communication device 110, such as a radio frequency (RF) transmitter or transceiver may be coupled to the receiver 108 to communicate the position of the locomotive to a controller 112 which may be mounted to the lead locomotive 102, or, alternatively, may be located at a remote site. The controller 112 may include a processor which determines a relative location for each locomotive 104 in the train consist 100 based on the position determined by its receiver 108. This process is periodically repeated for each locomotive 102 & 104 in the train consist 100 so that the position of each of the locomotives 102 & 104 may be monitored and the configuration of the train consist 100 may be tracked or verified as cars and locomotives are added to or removed from the train.

Preferably, the receivers 108 are capable of receiving a geo-referencing signal from a global positioning system in order to accurately geo-reference the positions each locomotive in the train The global positioning system is preferably the Global Positioning System (GPS), a space-based radio-navigation system managed by the U.S. Air Force for the Government of the United States. The Government provides civilian access to the Global Positioning System which is called the Standard Positioning Service (SPS). The Standard Positioning Service is intentionally designed to provide a positioning capability which is less accurate than the positioning service provided to military operators, however various techniques have been developed to improve the accuracy of the civilian positioning service wherein position accuracy of one to five meters may be achieved.

The system of the present invention may be utilized in conjunction with the Global Positioning System (GPS) to accurately geo-reference the position of each locomotive in the train consist 100. The receivers 108 may receive a reference signal from a satellite 114 operating as part of the GPS satellite constellation. Typically, the signals from at least three satellites are required to derive a coordinate position solution. Further reference signals which are not part of the government operated GPS system may also be used in order to compensate for the degraded civilian GPS signal (which may be transmitted as an FM carrier sublink by land based or space based locations or by an RS-232 data bus, for example). Such correcting signals may be provided by a third-party differential correction service provider. Other ways of correcting the degraded civilian signal may also be utilized which do not require an independent correcting signal to be transmitted. For example, signal processing techniques such as cross correlation of the military signal and the civilian signal may be utilized to improve the accuracy of the civilian signal.

Figure 2A:
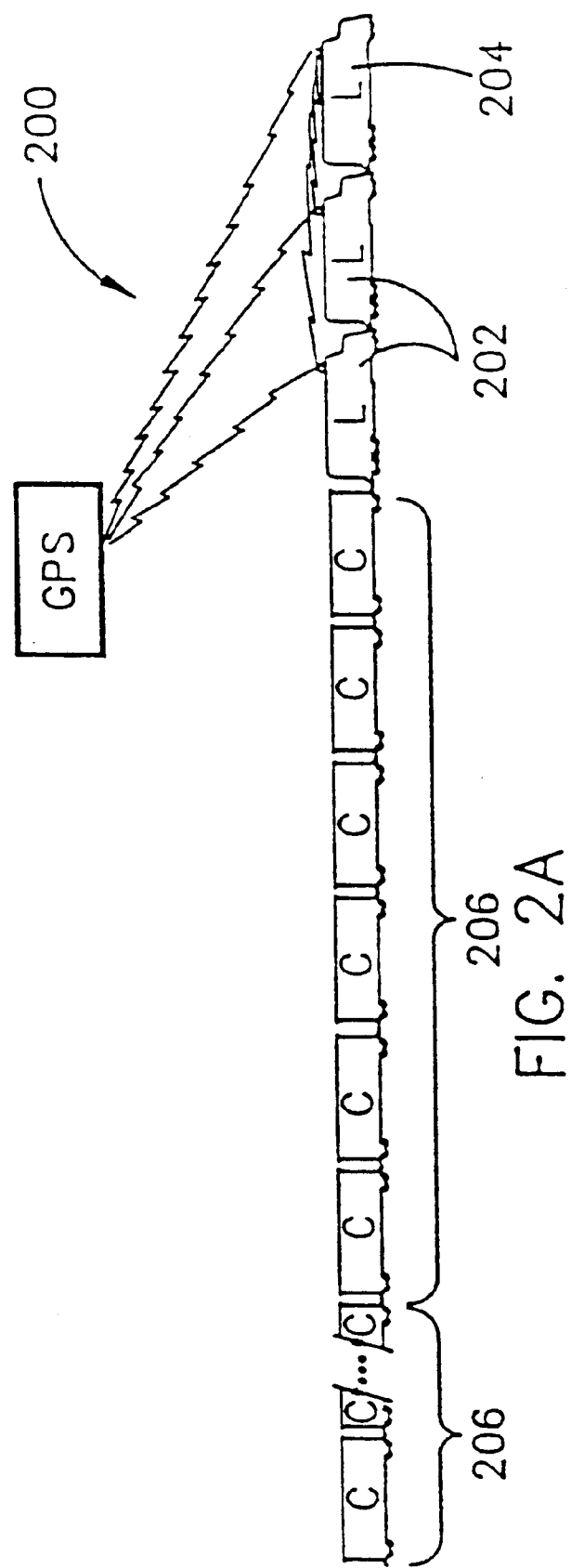
FIG. 2A is a diagrammatic view illustrating a train comprised of a single train consist.

Turning now to FIGS. 2A, 2B, and 2C, typical train consists are illustrated. As shown in FIG. 2A, a train consist 200 basically comprises one or more locomotives 202 & 204 and an associated group of cars 206. Cars 206 within the consist 200 may further be grouped together in blocks 208, or units of cars 204 which are moving toward a common destination. As shown in FIGS. 2B and 2C, one or more train consists 200 may be joined together to form a larger train consist 210 for movement through high traffic corridors. This larger train consist 210 may again be separated into the smaller consists 200 for intermodal or general freight service. Each train consist 200 & 210 may have one or more locomotives 202 & 204 which may be distributed throughout the train consist 200 & 210. Locomotives 202 & 204 may further be joined together in groups 212 comprising generally two or three locomotives. Preferably, simultaneous control of all locomotive 202 & 204 in the train consist 200 & 215 may be accomplished by means of distributed power and braking systems. Distributed power systems allow locomotives 202 & 204 to be distributed throughout a train by utilizing radio communication to remotely control the operation of several locomotives 202 from a lead locomotive 204. Typically, distributed power systems allow the crew of a train riding in a lead locomotive 204 to monitor and control tractive effort of each remote locomotive 202. Preferably, each locomotive 202 & 204 of the train may alternately be operated in either a lead or a remote role depending on its position in the train.

Figure 3:
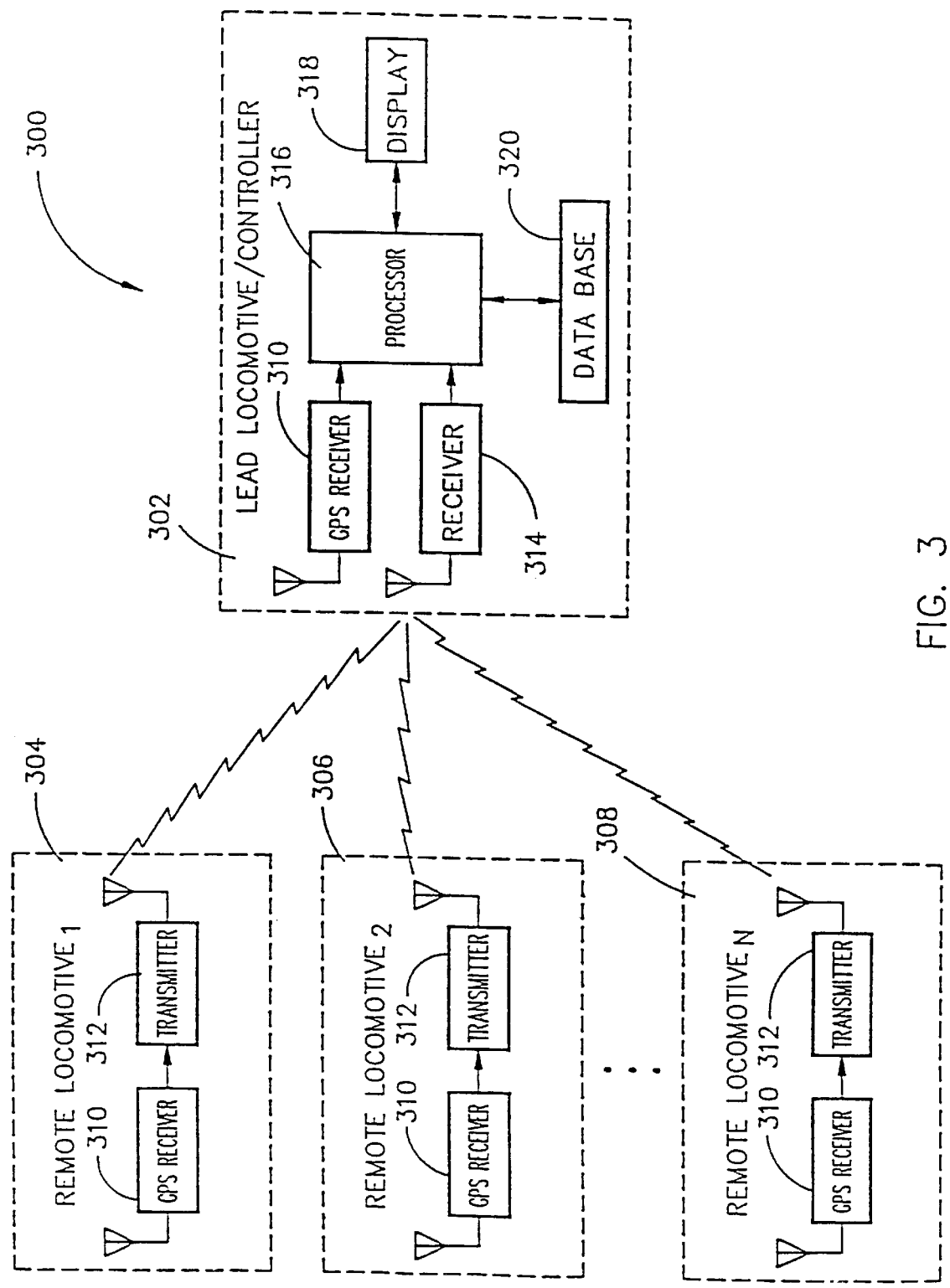
FIG. 3 is a block diagram further illustrating the apparatus of FIG. 1.

Turning now to FIG. 3, a block diagram is shown depicting schematically apparatus for implementing the system of the present invention. The system 300 preferably comprises a controller 302 which may be mounted in the lead locomotive and one or more remote units 304, 306 & 308 each of which may be mounted to a remote locomotive of the train consist. Each remote unit 304, 306 & 308 may include a global positioning system (GPS) receiver 310. The GPS receiver 310 receives a reference signal from the global positioning system and determines a geo-referenced coordinate position for the locomotive to which it is mounted. A transmitter 312, such as a radio frequency (RF) transmitter or transceiver, may be coupled to the GPS receiver 310 to transmit the determined geo-referenced position of the remote locomotive to a receiver 314 in the controller 302. The controller 302 may also include a GPS receiver 310 for determining a geo-referenced coordinate position for the lead locomotive. Preferably, the controller 302 comprises a processor 316 which determines the relative position of the lead and each remote locomotive in the train consist based on geo-referenced coordinate position of the controller 302 and each remote unit 304. Utilizing this information, the configuration of the locomotives in the train consist may be tracked or verified. This process is periodically repeated for each remote unit 304, 306 & 308 so that the position of each locomotive may be monitored and the configuration of the train consist may be tracked or verified as cars and locomotives are added to or removed from the train.

The controller 302 may utilize the relative position of each locomotive in the train consist to determine, for example, each locomotive's speed and distance from other locomotives in the train consist by applying basic kinematic methods. The system 302 may utilize this information to compare the speed and direction of each locomotive in the train consist. In this manner, the system 300 may confirm that all remote locomotives from which coordinate position information is received are in fact part of the same train consist. The system 300 may also look for locomotives in the train consist which have been omitted from the original consist list. Preferably, the system 300 would perform these functions as time averaged tests to reduce the likelihood of errors caused by, for example, coordinate position information received from locomotives of another train on a parallel track.

The controller 302 may further determine the distance between groups of locomotives in the train consist. In this manner, the system 300 may eliminate the need to pull the train past a data reader to determine the initial locomotive group positions (see FIGS. 2B and 2C). The distance between each locomotive group may be based on the coordinate positions of locomotives within the respective groups. The controller 302 may utilize these coordinate positions to calculate an averaged position of each locomotive group. Preferably, the initial determination of locomotive group positions may be accomplished while the train is stopped so that the coordinate position of each locomotive may be time averaged to improve accuracy. The determination may also be accomplished en route; however, movement of the train may cause reduced accuracy. The controller 302 may compare the determined distance between locomotive groups to an expected distance and may then take appropriate measures if the determined distance differs from an expected distance in excess of a predetermined variance. The expected distances between locomotive groups and variance may be entered into the controller 302 by the crew prior to operation of the train.

A display 318 such as, for example, a liquid crystal display (LCD), cathode ray tube (CRT) display, or the like may display the relative positions of locomotives in the train consist to the crew of the lead locomotive. The system 300 may, for example, display a comparison the number and position of locomotives determined to be in the train consist with a previously entered consist list and may notify the crew that the consist list may be in error. The information may further be displayed graphically by representing the train on a map of the surrounding track.

A database 320 may be operatively coupled to the processor 316. The database 320 may contain reference information including track topographical information such as, for example, geo-referenced coordinates defining the path of the track on which the train is traveling. The processor 316 may correlate the determined positions of the lead and remote locomotives with coordinates stored in the database 320 to determine, for example, if the train is traveling along a straight or curved section of track, or if the train is in an area having two or more parallel tracks. In this manner, the controller 302 may limit determinations of the relative position of locomotives in the train consist to areas having a single, straight track to prevent inadvertently including the locomotives of a passing train in the consist list.

Figure 4:
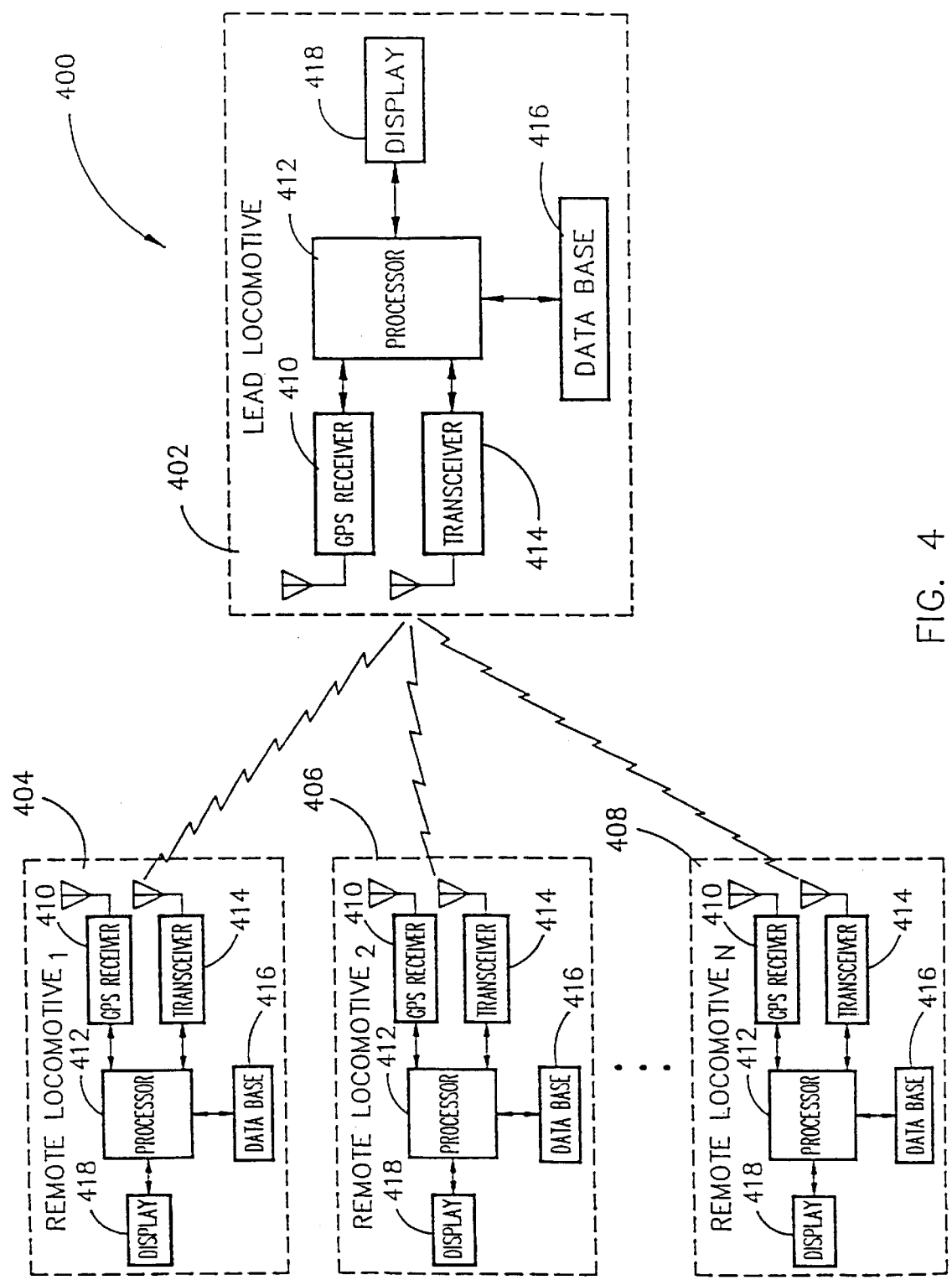
FIG. 4 is a block diagram illustrating an exemplary embodiment of the present invention wherein locomotives equipped with the present system may function as either the lead or a remote locomotive.

Referring now to FIG. 4, a block diagram is shown illustrating an exemplary embodiment of the present system wherein each locomotive may alternately may be operated as a lead or a remote locomotive in a train consist. According to the embodiment shown in FIG. 4, the system 400 comprises substantially identical position determination apparatus mounted to each locomotive 402, 404, 406 & 408 in the train consist. Preferably, the apparatus mounted to each locomotive 402, 404, 406 & 408 operate as either a controller or a remote unit, as shown in FIG. 3 and described herein, depending on whether the locomotive to which the apparatus is mounted is utilized as the lead 402 or a remote locomotive 404, 406 & 408 in the train consist. In this manner, locomotives may used interchangeably as lead or remote locomotives without replacing or modifying the hardware of the present system 400.

Each locomotive 402, 404, 406 & 408 preferably comprises a global positioning system (GPS) receiver 410 operatively coupled to a processor 412 which is, in turn, operatively coupled to a communication device such as an RF transceiver 414. The GPS receiver 410 receives a reference signal from the global positioning system. Utilizing this signal, the processor 412 may periodically determine a geo-referenced coordinate position for the locomotive on which it is mounted. The processor 412 may cause the transceiver 412 to transmit the geo-referenced position information for the locomotive to the controller (i.e., the apparatus mounted to the lead locomotive 402 in the train consist) where it is received by a second transceiver 414. Preferably, the processor 412 of the lead locomotive 402 may then determine the relative position of each locomotive 402, 404, 406 & 408 in the train consist based on geo-referenced coordinate position of that locomotive. Utilizing this information, the configuration of the locomotives 402, 404, 406 & 408 in the train consist may be tracked or verified. This process is periodically repeated so that the position of each remote locomotive may be monitored and the configuration of the train consist may be tracked or verified as cars and locomotives are added to or removed from the train.

A database 416 may be operatively coupled to the processor 412 of each locomotive 402, 404, 406 & 408. Each database 416 may contain reference information including track topographical information such as, for example, geo-referenced coordinates defining the path of the track on which the train is traveling. The processor 412 of the lead locomotive 402 may correlate the determined positions of the lead and remote locomotives with coordinates stored in the database 416 of the lead locomotive to determine, for example, if the train is traveling along a straight or curved section of track, or if the train is in an area having two or more parallel tracks. In this manner, the system 400 may limit determinations of the relative position of locomotives in the train consist to areas of single track or straight track. Alternatively, the processor 412 may apply an adjustment factor for the curvature of the track on which the train is traveling to the determination of each locomotive's relative position in the train consist. This adjustment factor may be stored in the database 416.

Each locomotive 402, 404, 406 & 408 may have a display 418 such as, for example, a liquid crystal display (LCD), cathode ray tube (CRT) display, or the like. The display 418 mounted to the lead locomotive provides means for displaying the relative positions of locomotives in the train consist to the crew of the lead locomotive. The system 400 may, for example, display a comparison of locomotives determined to be in the train consist with a previously entered consist list to notify the crew that the consist list may be in error. The information may further be displayed graphically by representing the train on a map of the surrounding track. Displays 418 mounted to remote locomotives 404, 406 & 408 may likewise display this information to crew riding in those locomotives.

It is believed that the method and apparatus for determining relative locomotive position in a train consist of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for determining a relative position of locomotives within a same train consist, the system comprising:
   a receiver mounted to a remote locomotive within said same train consist, said receiver receiving a signal from which a position of said remote locomotive is determined; and
   a processor operatively coupled to said receiver, said processor determining a relative position of said remote locomotive in said same train consist with respect to another locomotive in said same train consist based on the received signal from which the position of said remote locomotive is determined.

2. The system of claim 1, wherein said signal from which the position of said remote locomotive may be determined is provided by a global positioning system.

3. The system of claim 1, further comprising a first communication device coupled to said receiver, said communication device for operatively coupling said receiver to said processor.

4. The system of claim 3, wherein said communication device comprises a radio frequency transceiver.

5. The system of claim 3, wherein said communication device comprises a radio frequency transmitter.

6. The system of claim 3, further comprising a second communication device for operatively coupling said receiver with said processor.

7. The system of claim 6, wherein said second communication device is a radio frequency transceiver.

8. The system of claim 6, wherein said second communication device is a radio frequency receiver.

9. The system of claim 1, wherein said processor is mounted to a second locomotive in the train consist.

10. The system of claim 1, further comprising a database operatively coupled to said processor, said database for storing reference information against which the position of said remote locomotive may be compared.

11. The system of claim 10, wherein the reference information stored in the database is correlated with said determined position of said remote locomotive in said same train consist to determine whether said locomotives are traveling on a straight or curved track.

12. The system of claim 1, wherein said processor tracks or verifies a configuration of trains within said same train consist.

13. The system of claim 1, wherein said processor determines a speed or a distance of said remote locomotive with respect to said another locomotive in said same train consist based on the determined position of said remote locomotive.

14. A system for determining a position of locomotives in a same train consist, said apparatus comprising:

means for determining a position for each of one or more locomotives in said same train consist utilizing a reference signal received from a global positioning system; and means for calculating a relative position for each of said one or more locomotives in said same train consist based on the position of said locomotive determined from the reference signal received from a global positioning system, said calculating means further tracking relative locations of said locomotives within said same train consist.

15. The system of claim 14, further comprising means for communicating said position of said locomotive to said calculating means.

16. A method according to claim 15, further comprising the step of comparing the position of said locomotive with reference information stored in a database.

17. The system of claim 14, further comprising means for storing reference information against which the position of said locomotive may be compared.

18. A method for determining a relative position of a locomotive in a same train consist comprising the steps of determining a position for a first locomotive in said same train consist utilizing a reference signal received from a global positioning system;

communicating the determined position to a processor; and calculating a relative position for the first locomotive with respect to a second locomotive within said same train consist based on the received reference signal from which the position of said first locomotive is determined.

* * * * *